(12) United States Patent
Northrop et al.

(10) Patent No.: US 6,237,861 B1
(45) Date of Patent: May 29, 2001

(54) WINDOW DEICER AND ANTI-ICER

(76) Inventors: Thomas M. Northrop, 27129 NE. Rupard Rd., Duvall, WA (US) 98019; William M. Kirk, 6025 NW. 67th Ave., Ocala, FL (US) 34482

( * ) Notice: Subject to any disclaimer, the term of this patent is extended or adjusted under 35 U.S.C. 154(b) by 0 days.

(21) Appl. No.: 09/329,183

(22) Filed: Jun. 10, 1999

(51) Int. Cl.$^7$ .............................. B05B 17/00; B05B 1/10; B05D 17/00; B60S 1/46
(52) U.S. Cl. ............................................. 239/284.1; 239/1
(58) Field of Search .............................. 239/1, 284.1, 67, 239/69; 134/5, 123; 15/250.01, 250.05

(56) References Cited

U.S. PATENT DOCUMENTS

| | | |
|---|---|---|
| 1,720,140 | 7/1929 | O'Conner . |
| 1,828,613 | 10/1931 | Norton . |
| 2,012,218 * | 8/1935 | Burress .............................. 15/250.01 |
| 2,187,117 * | 1/1940 | Faulkner ........................... 15/250.01 |
| 2,278,206 | 3/1942 | Marshall . |
| 2,367,426 | 1/1945 | Patterson . |
| 3,401,707 | 9/1968 | Horwitz . |
| 4,032,090 | 6/1977 | Thornton-Trump . |
| 4,090,668 * | 5/1978 | Kochenour ..................... 239/284.1 X |
| 4,310,943 * | 1/1982 | Palma ................................. 15/250.01 |
| 4,733,972 * | 3/1988 | Weis .................................... 366/270 |
| 4,832,262 * | 5/1989 | Robertson ..................... 239/284.1 X |
| 4,877,458 | 10/1989 | Trop . |
| 4,904,844 | 2/1990 | Chamberlin . |
| 5,010,289 * | 4/1991 | Takada .................................... 322/8 |
| 5,012,977 * | 5/1991 | Karklins et al. ................... 239/284.1 |
| 5,028,017 * | 7/1991 | Simmons et al. ..................... 239/135 |
| 5,057,159 | 10/1991 | Weintraub . |
| 5,057,666 | 10/1991 | Takada . |
| 5,121,112 * | 6/1992 | Nakadozono .................... 340/870.16 |
| 5,141,160 * | 8/1992 | Waters .............................. 239/284.1 |
| 5,385,612 * | 1/1995 | Li .................................. 239/284.1 X |
| 5,458,299 | 10/1995 | Collins et al. . |
| 5,572,178 * | 11/1996 | Becker et al. ........................ 336/120 |
| 5,881,955 * | 3/1999 | Styne .................................... 239/310 |

OTHER PUBLICATIONS

1997 Jeep Grand Cherokee Owner's Manual, p. 71, 1996.*

* cited by examiner

Primary Examiner—David A. Scherbel
Assistant Examiner—Davis Hwu
(74) Attorney, Agent, or Firm—James Creighton Wray; Meera P. Narasimhan

(57) ABSTRACT

The window anti-icing/deicing apparatus and method spreads deicing agents onto the outside surface of the windshield and windows of a mobile vehicle and aircraft. The device includes deicing agents, a storage container, power supply, motor, pump, nozzles, and switching system circuitry. The device quickly provides a clear, defrosted window surface on each window prior to the time the vehicle is in motion. The system includes a container connected to a pump or a solenoid for directing the deicing agent to a suction side of the pump through an outlet in to the container. The deicing agent is supplied to a propeller and then via a distributor distributed onto targeted surfaces. Nozzles are provided for expressing the deicing agents onto surfaces. A power supply is connected to the system to operate the pump and the propeller for activating the deicing system. The system may be provided anywhere on a vehicle or an aircraft, such as trunks, roof racks, engine compartments or the like. The system may be integrated into roof racks for vehicles. Deicing agents are supplied to windows, locks, doors, undercarriages, tires and pavement surfaces. The system is also operable with a solenoid connected to the container. A computer, either provided onboard or remotely, controls the system. Sensors sense conditions around vehicles and relay information to the computers that process and trigger the system to start/stop the deicing process. The system has inbuilt switching to turn the system on or off and to reset the system and to sense if windows are open.

41 Claims, 2 Drawing Sheets

WINDOW DEICER AND ANTI-ICER

BACKGROUND OF THE INVENTION

The process of defrosting vehicle windows is a well established practice. The spreading of deicing agents on road surfaces in order to dissipate ice (deice), or prevent ice from forming (anti-ice) is a documented and tested practice. Devices used for those applications currently exist both in the air transportation industry and, more recently, on highways and bridges.

Defrost devices that operate when the vehicle is in operation, such as hot air blowers and rear window electrical defoggers, are mounted on many modern vehicles. Handheld devices used to scrape ice from the outside glass surface of vehicle windows are readily available.

U.S. Pat. No. 4,904,844 to Dale L. Chamberlin represents a remotely-operated vehicle windshield defrost system having the capability of being initiated before the driver enters the vehicle. The windshield may thus be essentially frost-free at the moment the vehicle enters traffic. There is no delay as with conventional defrost systems, which depend on the engine warming up before the defrost action begins.

In order to prevent frost from accumulating on a windshield of a vehicle, Japanese Patent Laid Open 58-17046 discloses an electric circuit where an ambient temperature sensor, a switch responsive to the output of the sensor, and a time relay are provided between a battery and a wiper motor. When the ambient temperature decreases below a predetermined temperature while the vehicle is parked, the sensor, the switch and the time relay are actuated in turn so as to intermittently drive the wiper motor. Thus, the wipers wipe away the frost on the windshield. The above mentioned device keeps ice from forming on the front windshield, however, no defrost mechanism is used on the side or rear windows.

U.S. Pat. 5,447,272 to Bernard J. Ask describes a device for spreading a deicing agent onto any surface upon detection of the onset of icing conditions preventing ice build up. One stated objective of this device is to provide the device in a size suited to its application, i.e., a large device for use on bridges and overpasses, a smaller device for use on parking garage ramps, driveways and a still smaller device for residential walkways and flat surface deicing.

However, no device is known for the spreading of a deicing agent on all the windows of vehicles or aircraft after ice has formed on the windows and/or prevent ice formation by anti-icing the windows. A need exists for improving the safety of both drivers and passengers of moving vehicles by anti-icing and deicing vehicle windows for clear vision prior to operation of the vehicle. The present invention provides a convenient vehicle deicing/anti-icing for the improved comfort and safety of the vehicle operator and passengers. Treating aircraft windows for anti-icing/deicing is contemplated within the scope of this invention.

SUMMARY OF THE INVENTION

The present invention relates to a device that will spread a deicing agent onto the outside surface of the windshield and all windows of a mobile vehicle and aircraft. The key components of the device include, but are not limited to, the deicing agent, the agent storage container, power supply, motor, pump, agent nozzles, and switching system circuitry.

The principal objective of the vehicle deicer is to anti-ice and deice the windows of vehicles, both prior to and during vehicle operation. The primary benefit of attaining the above stated objective is providing complete and maximum visibility for both the driver and passenger of both the primary vehicle and any other vehicles or property that may possibly be involved in an accident caused by decreased visibility due to ice accumulation on the windows and windshield. The device deices the entire surface of each window to allow for maximum visibility. The windows can be on vehicles which include all modes of transportation such as, but not limited to, trucks, trains, vans, automobiles, aircraft, and the like.

The following are some of the unique features incorporated into the product. The device provides a clear, defrosted window surface on each window prior to the time the vehicle is in motion. The device provides a clear, defrosted window surface on each window quickly. The windows and windshield are thus essentially frost-free at the moment the vehicle enters traffic. There is no delay as with conventional defrost systems, which depend on the engine warming up before the defrost action begins. The device anti-ices/deices all surfaces used for visibility, including the front, rear and side windows, the windshield and the back window, as well as outside mirrors. The device uses environmentally friendly and non-corrosive means of defrosting the window surfaces. The device eliminates the need for the vehicle operator or passenger to manually remove partial frost with other deicing devices, such as a window scraper.

These and further and other objects and features of the invention are apparent in the disclosure, which includes the above and ongoing written specification, with the drawings.

DETAILED DESCRIPTION OF THE PREFERRED EMBODIMENTS

Figure 1:
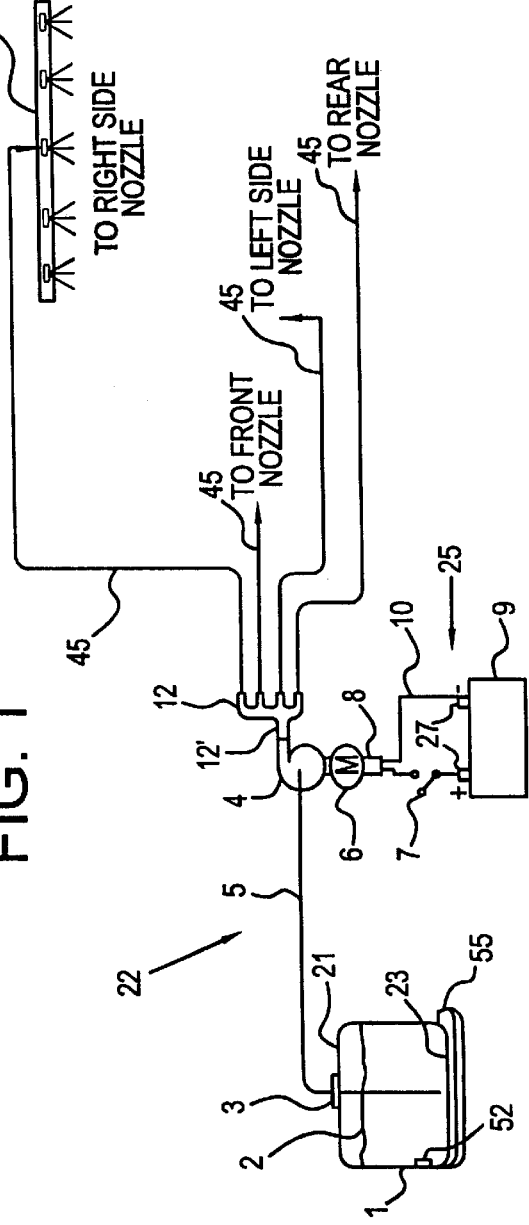
FIG. 1 is a schematic of the components of the window deicer.

As shown in FIG. 1, a preferred vehicle deicer includes a weatherproof container 1, preferably made of a strong molded plastic material. The container 1 provides a sealed durable housing for the deicing agent 2. The container 1 may be incorporated into a bolt on structure 55 attached to the vehicle or may be directly mounted onto the vehicle. The preferred container has an accessible, removable lid 3 used for refilling the deicing agent 2. Other refilling modes are within the scope of this invention. The invention is adaptable for aircraft application to treat aircraft windows.

The preferred container 1 is of a weatherproof and corrosion resistant material that may store deicing agent 2 for use by the present invention and is sized in accordance with the application and volume of deicing agent required. The deicing agent 2 is directed to the suction side of the pump 4 through a hose 5 that extends through the top 21 of the container 1 close to the lowest point 23 of the container, so that nearly all of the deicing agent in the container will be expelled before the container is empty. The pump 4 is constructed to allow for running dry without damage to its components. The pump 4 may be self-priming and located such that the vacuum produced by turning the pump is sufficient to pull the deicing agent 2 into the suction side of the pump 4 overcoming both the gravitational resistance of the deicing agent and the frictional flow resistance of the hose 5.

Figure 3:
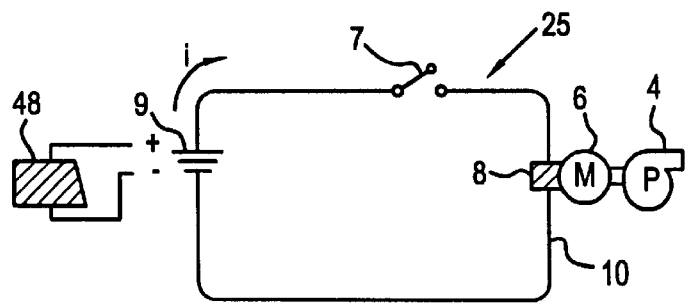
FIG. 3 is a schematic of the circuitry of the vehicle deicer with a pump.

The motor 6, as shown in FIGS. 1 and 3, drives the pump 4 and powers spreading of the deicing agent. Preferably, a 12 volt motor is used. Battery 9 may be recharged with the vehicle's charging system, or with solar power (solar panel 48 in FIG. 6), or power sources external to the vehicle. The motor 6 is activated when the normally open switch 7 is closed, completing the switching circuitry 25 and switching the electrical current to the motor relay 8. The motor 6 is turned until the switch is opened again, thereby breaking the circuit 25. The switch 7 allows electrical power to the motor 6 via wires 10 that pass from the battery 9 terminal posts 27 through the motor relay 8 to the motor 6 through the wires 10. In one preferred embodiment, the vehicle deicer uses a liquid deicing agent.

Figure 2:
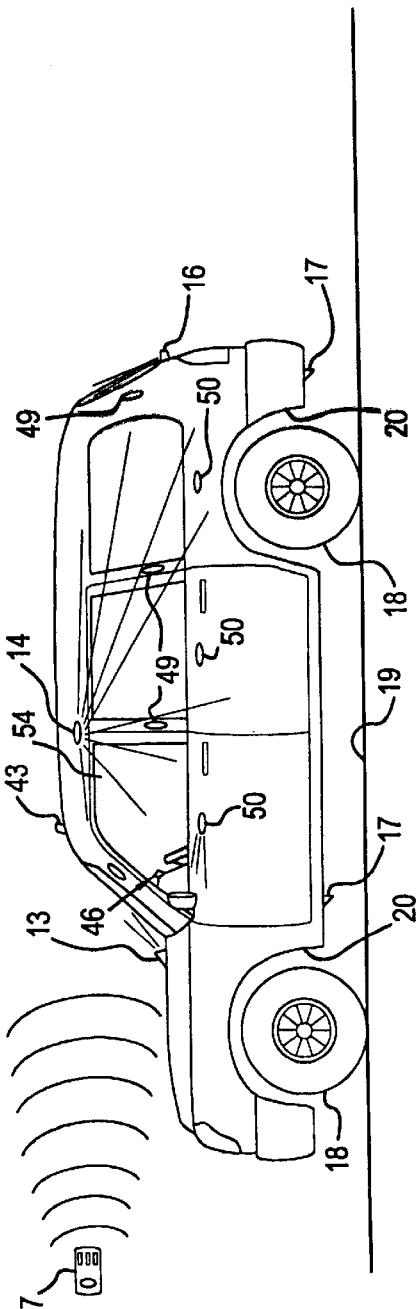
FIG. 2 is an elevation view of the nozzles on a vehicle and the approximate discharge pattern of the deicing agent.

The pump 4 forces the deicing agent 2 out of the propeller 12' through exit manifold 12 to ejector nozzles. As shown in FIG. 2, a front ejector nozzle 13, rear ejector nozzle 16, and left and right ejector nozzles 14 and 15 are supplied with deicing agent 2. When the device is activated, deicing agent 2 is applied to the targeted surface from the ejector nozzles, thereby providing anti-icing/deicing protection. The deicing agent supply piping and nozzles may be mounted on the roof gutters of the vehicle or contained within a structure mounted to the vehicle containing the deicer 22. The nozzles may be located such that the deicing agent is sprayed onto a vehicle's doors, locks, and/or windows either from above the window, from below the window 50, or from some point in between 49. Deicing agent may also be distributed using a combination of nozzles and/or perforated tubing 51 placed adjacent to target surfaces.

As shown in FIG. 2, additional nozzles 17 mounted to the underside of the vehicle may be used to anti-ice/deice the pavement surface under and directly behind the vehicle for added traction between the vehicle tires 18 and the pavement 19. The deicing agent may be sprayed directly onto the tires 18 themselves, into the wheel wells 20, or onto the pavement 19.

The container 1 may be replaceable. Additional containers 1 may be kept in the vehicle for replacing a spent container. Also, in case of any component failure the container may be removed and the deicing agents manually applied to the vehicle's windows. The level of deicing agent 2 in the container 1 is measured and a level sensor 52 transmits a signal to warn of depleted levels of deicing agent. A pressure transducer, electrical conductive wires, or floatation sensors may be used to measure the level of the deicing agent within the container. A signal may be relayed to a display that is readily observable by the operator of the vehicle.

Controls for activating operation of the vehicle deicer 22 may be located on the dashboard of the vehicle for easy manipulation by the vehicle operator. A push button for activating the deicer 22 may also be located on the exterior of the vehicle, or carried remotely by remote control 47. Operation of the deicer 22 may also be controlled by an onboard computer. The computer may be programmed to cause the deicer 22 to activate at certain time intervals or when sensed conditions are right for the formation of ice. Sensors 53 located on the exterior of the vehicle may sense temperature and/or humidity and send a signal that activates the deicer 22. Deicing agent may also be supplied to the nozzles by gravity or air pressure. Sensor 54 detects if the windows are open and acts as a switch to stop the deicer from operating if side windows are open.

Figure 4:
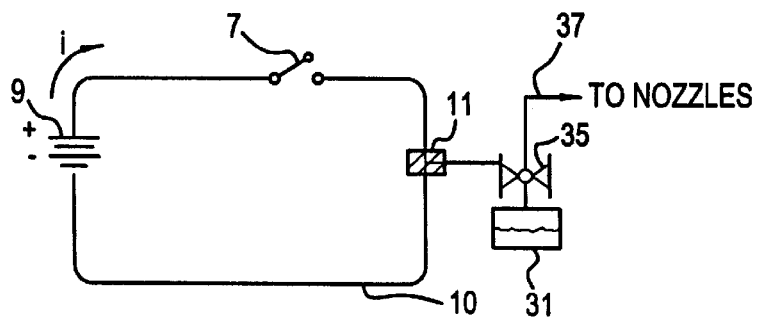
FIG. 4 is a schematic of the circuitry of the vehicle deicer with a pressurized container.

In another preferred embodiment, shown in FIG. 4, a pressurized container 31 may be used. The pump is replaced by an electrical solenoid 11 that opens or closes a valve 35 to control the flow from the pressurized container 31 to the ejector nozzles 37. The valve 35 may be activated mechanically (gear type operated valve), manually (manually operated ball valve with handle), or electrically or hydraulically (solenoid or hydraulic actuated valve).

Figure 5:
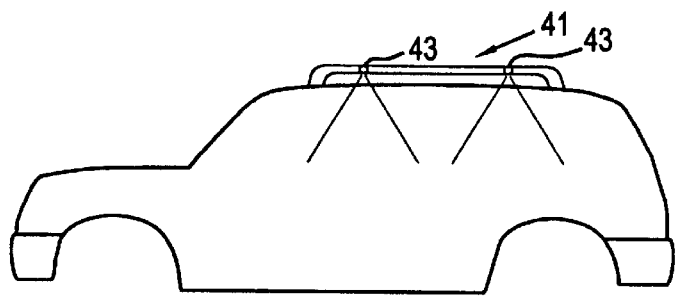
FIG. 5 is an elevation view of a vehicle with nozzles mounted in the roof rack.
Figure 6:
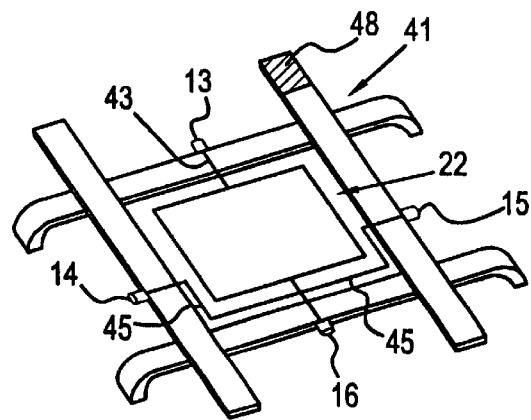
FIG. 6 is a perspective view of a roof rack with the vehicle deicer integrated into the roof rack.

Typical vehicle deicer locations may include the vehicle frame, engine compartment, or trunk. FIGS. 5 and 6 show the vehicle deicer 22 integrated into a car's roof rack 41. Several nozzles 43 may be used along a side of a roof rack, as shown in FIG. 5. In another embodiment, one nozzle 13, 14, 15, and 16 may be used per side of a roof rack 41, as shown in FIG. 6. The roof rack may be permanently or removably mounted to the vehicle. The deicing agent supply piping 45 and nozzles 43 may be mounted on the roof rack 41.

The inventive window deicer is usable on aircraft and other transportation systems requiring window deicing. The deicer is used to deice all windows, such as windshields and other surfaces, along with the deicing of wings of aircraft.

While the invention has been described with reference to specific embodiments, modifications and variations of the invention may be constructed without departing from the scope of the invention.

We claim:

1. Window anti-icer/deicer apparatus comprising a container, a deicing agent in the container, an inlet in the container for receiving the deicing agent, a propeller, an outlet connecting the container and the propeller for receiving and supplying the deicing agent from the propeller, at least one supply line connected to the propeller for receiving deicing agent, a distributor connected to the supply line for receiving and distributing the deicing agent onto targeted surfaces to be treated, a motor connected to the propeller, and a power supply for operating the motor and the propeller, further comprising sensors connected to the deicer for relaying temperature and humidity information to the computer for triggering distribution of the deicing agent when required.

2. The apparatus of claim 1, wherein the sensors are provided on surfaces to be deiced.

3. Window anti-icer/deicer apparatus comprising a container, a deicing agent in the container, an inlet in the container for receiving the deicing agent, a propeller, an outlet connecting the container and the propeller, a supply manifold connected to the propeller for receiving and supplying the deicing agent from the propeller, at least one supply line connected to the supply manifold for receiving deicing agent, a distributor connected to the supply line for receiving and distributing the deicing agent onto targeted surfaces to be treated, a motor connected to the propeller and the supply manifold and a power supply for operating the motor and the propeller, further comprising an exit manifold connected to the distributor for receiving the deicing agent, plural ejector nozzles connected to the exit manifold for ejecting deicing agent onto targeted surfaces, and plural pipes supplying the deicing agent from the exit manifold to the exit nozzles, wherein the pipes and nozzles are mounted along vehicle window edges for spraying the deicing agent onto a vehicle's doors, locks, and windows, from above, below and points in between windows, wherein the deicer is mounted on a vehicle roof rack.

4. The apparatus of claim 3, further comprising a mounting device for mounting the container on vehicles.

5. The apparatus of claim 4, wherein the power supply is selected from a group consisting of a vehicle power source, a power take off, auxiliary drive shaft, auxiliary gear drive, and belt drive.

6. The apparatus of claim 3, further comprising a cover for removably sealing the inlet.

7. The apparatus of claim 3, wherein the container is of weatherproof, leakproof, corrosion resistant, and durable material.

8. The apparatus of claim 7, wherein the material is plastic.

9. The apparatus of claim 3, wherein the power supply is selected from a group consisting of battery, external power source, and solar power.

10. The apparatus of claim 3, further comprising switching circuitry having a switch connected to the motor for activating the motor when switched on or deactivating and-reseting the motor when switched off.

11. The apparatus of claim 10, wherein the circuitry comprises connections to the motor, the power supply and the switch.

12. The apparatus of claim 3, Wherein the pipes and nozzles are mounted on vehicle roof gutters.

13. The apparatus of claim 3, further comprising perforated tubing along targeted surfaces connected to the distributor for distributing the deicing agent on targeted surfaces.

14. The apparatus of claim 13, therein the targeted surfaces include windows, mirrors, vehicle undersides to anti-ice/deice pavement surfaces, tires, and wheel wells.

15. The apparatus of claim 3, wherein the container is removable.

16. The apparatus of claim 3, further comprising a level sensor connected to the container for sensing a level of fluid, and an audio and/or visual indicator connected to the sensor to provide warning of low levels of deicing agent in the container.

17. The apparatus of claim 16, wherein the sensor is selected from the group consisting of pressure transducers, electrical conductive wires and floatation sensors.

18. The apparatus of claim 16, wherein the indicator is a display that is readily observable by users.

19. The apparatus of claim 3, further comprising controls for activating the motor and the propeller.

20. The apparatus of claim 19, wherein the controls are located on vehicle dashboards.

21. The apparatus of claim 19, wherein the controls are remotely or manually operable.

22. The apparatus of claim 19, wherein the controls comprise a computer for storing and processing information from the deicer.

23. The apparatus of claim 3, wherein the deicer is located on a vehicle frame or an engine compartment, or in a trunk.

24. The apparatus of claim 3, wherein the deicer is integral with the roof rack.

25. The apparatus of claim 24, wherein the roof rack comprises pipes for distributing the deicing agent.

26. The apparatus of claim 25, further comprising nozzles connected to the pipes along all sides of the rack for receiving and distributing the deicing agent on targeted surfaces.

27. The apparatus of claim 24, wherein the roof rack is removably mounted on a vehicle.

28. The apparatus of claim 3, further comprising a window sensor for sensing open/closed positions of the windows.

29. A vehicle window deicer comprising a pressurized container, a deicing agent in the container, an electrical solenoid connected to the container, a control valve on the solenoid for controlling a flow from the pressurized container, plural ejector nozzles connected to the container for receiving and distributing the deicing agent from the container, computer connected to the deicer, sensors connected to the deicer for relaying temperature and humidity information to the computer and for triggering distribution of the deicing agent in response to sensed conditions.

30. The deicer of claim 29, wherein the valve is mechanically activatable.

31. The deicer of claim 30, wherein the valve is a gear type valve.

32. The deicer of claim 29, wherein the valve is manually operable.

33. The deicer of claim 32, wherein the valve is a ball valve with handle.

34. The deicer of claim 33, wherein the valve is electrically operable.

35. The deicer of claim 34, wherein the valve is a solenoid.

36. The deicer of claim 29, wherein the valve is hydraulically operable.

37. The deicer of claim 36, wherein the valve is an hydraulic actuated valve.

38. A window deicing method comprising providing a deicing system having a deicing agent in a container, connecting the container to a pump, directing the deicing agent to a suction side of the pump through an outlet in the container, creating a vacuum with the pump thereby overcoming gravitational resistance and frictional flow resistance, supplying the deicing agent to a distributor, distributing the deicing agent onto targeted surfaces, connecting a power supply to the pump for supplying power and activating the deicing system, the controlling further comprising providing a computing system, providing sensors in the deicing system for sensing ambient icing conditions, relaying sensed information to the computing system, processing the relayed information in the computing system, signalling the deicing system, activating the deicing in response to the sensed conditions.

39. The method of claim 38, wherein the activating is provided for a predetermined intervals and duration.

40. The method of claim 38, further comprising controlling the pump wherein through a motor connected to the pump, the controlling comprises providing a motor relay, connecting a switch to the relay, switching the system on for deicing targeted surfaces and switching the system off for deactivating and resetting the system.

41. The method of claim 38, wherein the controlling is by manual or remote means.

* * * * *

UNITED STATES PATENT AND TRADEMARK OFFICE
CERTIFICATE OF CORRECTION

PATENT NO. : 6,237,861 B1          Page 1 of 1
DATED      : May 29, 2001
INVENTOR(S) : Thomas M. Northrop and William M. Kirk It is certified that error appears in the above-identified patent and that said Letters Patent is hereby corrected as shown below:

Column 3,
Line 21, change "propeller" to -- supply line --.

Claim 10,
Line 4, delete "and-resetting".

Claim 38,
Line 9, before "for" insert -- manifold --.

Claim 40,
Line 2, delete "wherein";
Line 3, before "the" insert -- wherein --.

Signed and Sealed this

Fifth Day of March, 2002

Attest:

JAMES E. ROGAN
Attesting Officer     Director of the United States Patent and Trademark Office